UNITED STATES PATENT OFFICE.

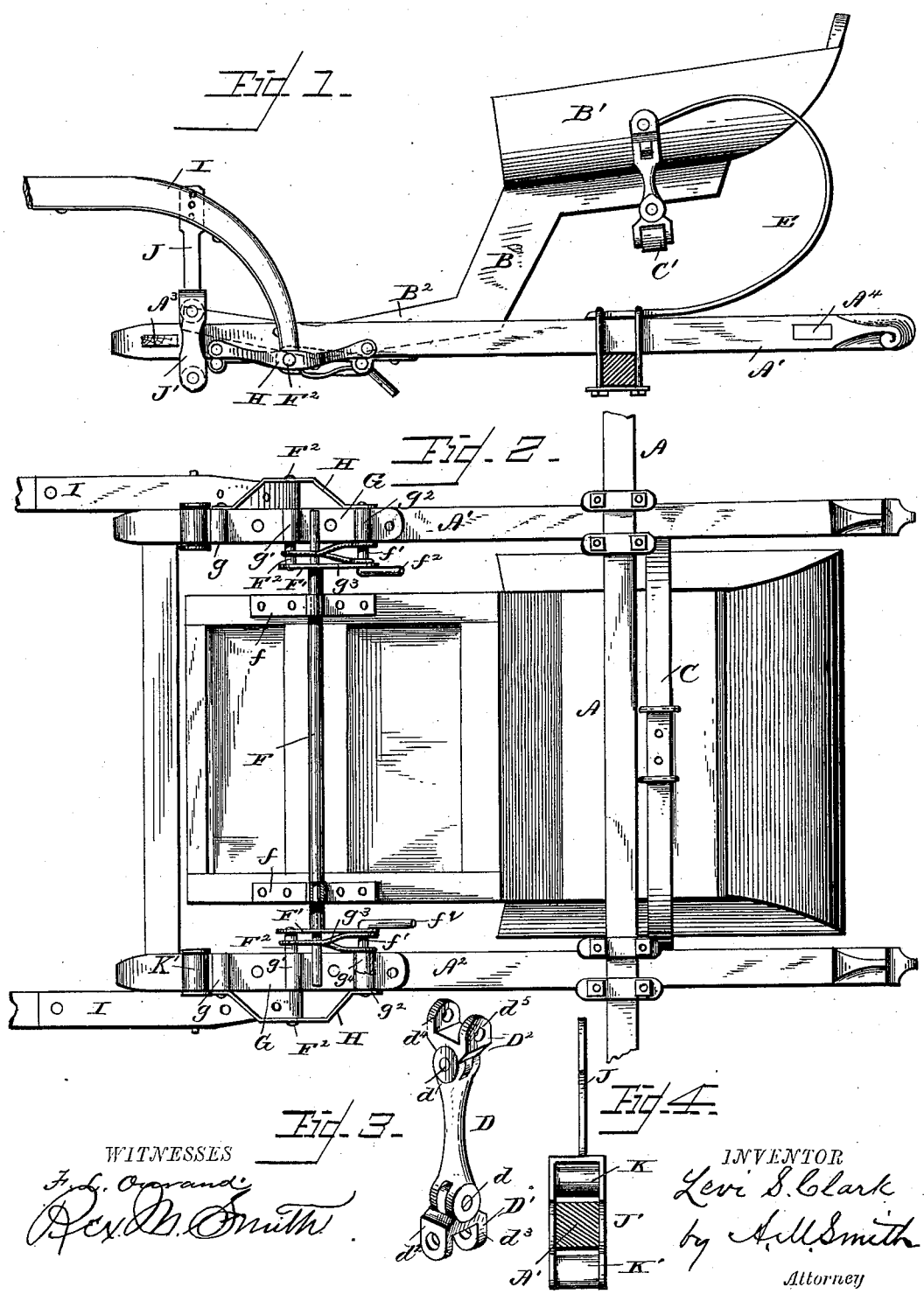

LEVI S. CLARK, OF DOYLESTOWN, OHIO, ASSIGNOR OF THREE-FOURTHS TO ORRIN G. FRANKS AND GEORGE T. BAUGHMAN, BOTH OF SAME PLACE, AND JOHN H. WARREN, OF LODI, OHIO.

TWO-WHEELED VEHICLE.

SPECIFICATION forming part of Letters Patent No. 308,137, dated November 18, 1884.

Application filed March 28, 1884. (No model.)

*To all whom it may concern:*

Be it known that I, LEVI S. CLARK, of Doylestown, county of Wayne, and State of Ohio, have invented a new and useful Improvement in Two-Wheeled Vehicles, of which the following is a full, clear, and exact description, reference being had to the accompanying drawings, making part of this specification.

My invention relates to an improvement in sulkies or two-wheeled vehicles; and it consists in the following-described elements.

My invention consists, first, in the combination, with an arched spring secured to the seat upon its under side, of swiveling links attached to the extremities of said spring, said links being secured to and pendent from or supported by the overhanging ends of two C-springs secured to the side frame-timbers of the vehicle directly above the axle thereof, or in close proximity thereto.

My invention consists, also, in providing the floor of the body of the vehicle, upon its under side, with a supporting-rod secured thereto, and journaled at or near its ends in adjustable links or crank-arms, whereby the body of the vehicle is adapted to be adjusted forward or backward relatively to the frame which supports it, for a purpose hereinafter set forth, and when so adjusted to be held to its adjustment by means of devices hereinafter described.

My invention consists, also, in pivoting the thills of a two-wheeled vehicle upon the outer sides of the axle-frame, within loop-brackets attached to said timbers, and containing pivots which are journaled in corresponding perforations or bearings in the rear ends of the thills.

My invention consists, also, in the combination, with the thills pivoted as described, of an adjustable bumper attached thereto, and forked or expanded so as to embrace one of the frame-bars, and provided within its forked portion, above and beneath the frame-bar, with elastic cylinders or rollers for relieving the vehicle of the motion of the horse.

My invention consists, lastly, in a peculiar and novel construction of link interposed between the arched and C springs above referred to, whereby the greatest amount of play or adjustability is secured and the springs allowed to act freely and be acted upon, for the purpose of relieving the vehicle of jar.

In the accompanying drawings, Figure 1 is a side elevation of a portion of a two-wheeled vehicle with my improvements applied. Fig. 2 is a plan view of same, looking from underneath, showing the arrangement of means for shifting or jumping the vehicle-body relatively to the axle and its frame or truck. Fig. 3 is a detail view of the universal link interposed between the C and arched springs of the vehicle, and Fig. 4 a detached enlarged view of the yielding bumper.

A represents the axle of the vehicle, upon which is arranged a rectangular frame composed of side bars, $A'$ $A^2$, and end bars, $A^3$ $A^4$, as is the common construction in vehicles of this class.

B represents the body of the vehicle, composed, substantially, of a seat portion, $B'$, a floor, $B^2$, and a slightly-inclined, nearly vertical portion, $B^3$, connecting said seat and floor.

Secured beneath the seat $B'$, to its under side, is an arched spring, C, curved as it approaches its extremities in a downward direction, and provided at each extremity with a cylindrical portion, $C'$, which is perforated to receive a pivotal pin, which passes also through the lower portion of a universal link, to be described. This link (shown in detail in Fig. 3) is composed of three parts, D, $D'$, and $D^2$, the part D being formed, substantially as shown, with suitable sockets at its ends for the reception of the parts $D'$ and $D^2$, which are pivoted therein, the part $D'$ by means of a pin, $d$, passing through the socketed end of part D, and also through a lug or ear formed on part $D'$, corresponding to the said socket, and the part $D^2$ pivoted to the opposite end of link D by means of a pin, $d'$, inserted in perforations in the socketed end of link D and a lug formed upon part $D^2$ in the same manner as at the opposite end of link D, just described, except that the pivotal pin $d$ at the lower end of the link is set at a right angle to the pin $d'$ in the upper end of the link. The part D' is provided with parallel perforated lugs or ears $d^2\ d^3$, as shown, which are adapted to receive between them the cylindrical portion C', formed upon one extremity of the arched spring C above described, and a pin or bolt is inserted through the ears $d^2\ d^3$ and said cylindrical portion C' of spring C, as above described, thus forming a pivotal connection between the link and arched spring. The part D² of the link D is also formed with ears $d^4\ d^5$, similar to those $d^2\ d^3$ of part D'. The ears $d^4\ d^5$ are adapted to receive between them a cylindrical formation or bearing upon the upper overhanging end of a C-spring, E, said bearing being similar to that C' of the arched spring C, and containing a pin, which also passes through the ears $d^4\ d^5$ and forms a pivotal connection between the two parts. There are two of these C-springs E, one upon either side of the vehicle-body B, and both are provided with the links D, just described, pendent therefrom and extending down to the ends of the arched spring C, to which, as previously stated, they are attached. The springs E are curved substantially in the arc of a circle until they rest upon the side timbers of the axle truck or frame immediately over the axle of the vehicle, and to these timbers they are firmly secured, preferably by the same staples or bolts which are employed for securing the axle and its frame together, as shown in Fig. 1. The C-springs may be made of a width corresponding with that of the timbers A' A², if preferred, and of any thickness or strength desired.

Beneath the floor of the vehicle-body B is attached, by means of loop-bearings $f$, a rod, F, which at or near its ends is journaled in bearings in links F' F', pivoted through short shafts F² F² in bearings secured to the under sides of timbers A' A², as hereinafter described. By this simple construction the rod F, and with it the vehicle-body, is adapted to be "jumped" or adjusted forward or backward relatively to the axle by rocking the links F' F' upon their pivotal shafts, either in a forward or backward direction. This provision for jumping the vehicle-body forward or backward relatively to the axle is made for the purpose of accommodating one or two or more persons, as the case may be, for it is very desirable, where there is a heavy load, to throw the weight as nearly over the axle of the vehicle as possible. When the vehicle-body is adjusted as desired, by means of the links or crank-arms described, the said links are adapted to be held securely in place by means of pins $f'\ f''$ passing through the swinging ends of the links or crank-arms and into sockets formed upon the side timbers of the truck-frame. Thus the outer end of each link or crank-arm is held stationary and not allowed to escape until the pin $f'$ is removed from its socket on the axle-frame. The sockets for the pin $f'$ and the bearing for the shaft F² are by preference all formed in a single piece of metal, G, secured to the under side of one of the frame-timbers, and provided with semi-annular depressions $g$, $g'$, and $g^2$.

The fastening-pin $f'$ is provided with a handle, $f^2$, for convenience in operating the same, and it is also provided with a suitable spring, $g^3$, surrounding it, which bears against said handle $f^2$ at one end, and against a shoulder or enlarged portion, $g^4$, at the other, as shown in Fig. 2, whereby the pin $f'$ is forced into its socket $g^2$ by the pressure of the said spring upon it, and not allowed to escape until the tension of said spring is overcome in the act of withdrawing the pin from its socket.

Loop-brackets H H are secured to the frame-timbers A' A² upon the outside thereof, and the thills I I of the vehicle are pivoted at their rear ends within said brackets upon the shafts F² F², hereinbefore described as containing the links or crank-arms F' F'. Said shafts F² F² are extended beyond the timbers A' A² for this purpose, passing through perforations in the brackets, upon the outer side of which they are provided with heads, or receive nuts, as preferred.

J J' represent a yielding bumper, attached adjustably, as shown, to one of the thills I by means of a pin passing through one of several perforations in the arm J into a socket in the said thill. This pin may be inserted through either of the several perforations mentioned and shown, thus providing for the adjustment of the thills, which, by this means, may be adjusted to any angle or inclination desired. The portion J' of the bumper is in form a rectangular frame, casing, or yoke, in which are contained two elastic cylinders or rubber rollers, K and K', mounted upon pins provided for that purpose. Said cylinders are located within said rectangular frame at such a distance apart that they are adapted to receive between them and allow the desired amount of play of one of the side timbers of the truck-frame—for example, A'—and when in proper working position to bear the relation to said timber shown in Fig. 4, or, in other words, to occupy a position one above and the other beneath the timber A', thus forming an elastic connection of the thills with the main truck-frame of the vehicle, and relieving the latter of the motion of the horse. Two of these bumpers J J' are, by preference, employed—one for each thill.

Having now described my invention, I claim as new—

1. In a two-wheeled vehicle, the two springs, substantially of C shape, secured to the side frame-timbers directly above the axle, in combination with the vertically-acting arched spring secured to the under side of the seat or vehicle-body, and the interposed pendent links connecting said arched spring with and suspending it from the said C-springs, in the manner substantially as and for the purpose described.

2. In a two-wheeled vehicle, the combination, with the C-spring and the arched spring, of the interposed link provided with a universal joint at each end, substantially as shown and described.

3. In a two-wheeled vehicle, the body thereof suspended or upheld at its rear end by means of the C and arched springs, in combination with and supported at its forward end by a transverse sustaining-rod secured thereto and connected at or near its extremities with crank-arms for adjusting the said sustaining-rod, and with it the vehicle-body, forward or backward relatively to the axle, substantially as and for the purpose described.

4. In a two-wheeled vehicle, the body thereof upheld by means of suitable springs interposed between the same and the axle or truck frame, in combination with a forward transverse sustaining-rod secured to the under side of the body, and connected at or near its ends with adjustable links or crank-arms held at the desired adjustment by suitable fastening devices, all substantially as and for the purpose described.

5. The thills pivoted at their rear extremities to the side timbers of the vehicle, upon the outer sides thereof, in combination with laterally-projecting loop-brackets secured to said side timbers, extending outside of the thill ends and supporting the outer ends of the thill-pivots, substantially as shown and described.

6. The thills pivoted within the loop-brackets secured to the side timbers of the truck-frame, upon the same shaft that contains the swinging links or crank-arms, for adjusting the relation of the vehicle-body to the axle, substantially as described.

7. In a two-wheeled vehicle, the thills thereof pivoted to the axle-frame, in combination with an adjustable yoke surrounding one of the side timbers of the axle-frame or truck, and provided on opposite sides of said timbers with elastic bumpers, with sufficient space between said bumpers to allow the motion of the horse without moving or jarring the vehicle, and a slotted or perforated standard adapting the thills to be adjusted relatively to said bumper and to the truck-frame, substantially as described.

8. In a two-wheeled vehicle, the thills thereof pivoted within horizontally-projecting loop-brackets attached to the axle-truck frame, in combination with a pivoted yoke attached to each of the thills, adjustable vertically relatively to the thills, and provided with elastic or yielding cylinders or rollers above and beneath the side timbers, for the purpose and substantially as described.

9. In a two-wheeled vehicle, an elastic bumper consisting of a rectangular frame containing two or more elastic cylinders or rollers, said cylinders being so arranged within the rectangular frame that when the latter is applied to the side frame-timber of the axle-truck they will rest one above and the other beneath the said timber, in combination with both of the thills of the vehicle, to which said rectangular frame is adjustably attached by means of an arm extending upward from said rectangular frame, and provided with one or more perforations adapted to receive a fastening-pin, which also enters a socket or perforation in the thill, all substantially as described.

10. The combination, with the fastening-pin which holds the adjustable link or crank-arm for shifting or jumping the body to its adjustment, of a spring for holding the said fastening-pin in its socket or perforation, and preventing the accidental displacement of the same by the jarring of the parts or otherwise, substantially as shown and described.

In testimony whereof I have hereunto set my hand this 24th day of March, A. D. 1884.

LEVI S. CLARK.

Witnesses:
C. H. WILSON,
ANDREW EBERLIN.